US009988943B2

(12) United States Patent
Chasse, Jr. et al.

(10) Patent No.: US 9,988,943 B2
(45) Date of Patent: Jun. 5, 2018

(54) FITTING FOR MID-TURBINE FRAME OF GAS TURBINE ENGINE

(71) Applicant: UNITED TECHNOLOGIES CORPORATION, Hartford, CT (US)

(72) Inventors: James P. Chasse, Jr., Wethersfield, CT (US); Ryan K. Snyder, Glastonbury, CT (US); William K. Ackermann, East Hartford, CT (US); Pellegrino J. Pisacreta, Newtown, CT (US); Judith F. Brooks, Palo Alto, CA (US); Stephanie Ernst, Meriden, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 336 days.

(21) Appl. No.: 14/696,615

(22) Filed: Apr. 27, 2015

(65) Prior Publication Data

US 2016/0312660 A1    Oct. 27, 2016

(51) Int. Cl.
| | | |
|---|---|---|
| F01D 25/12 | (2006.01) | |
| F01D 25/28 | (2006.01) | |
| F02C 7/18 | (2006.01) | |
| F01D 25/14 | (2006.01) | |

(52) U.S. Cl.
CPC ............. *F01D 25/28* (2013.01); *F01D 25/12* (2013.01); *F01D 25/14* (2013.01); *F02C 7/18* (2013.01); *Y02T 50/675* (2013.01)

(58) Field of Classification Search
None
See application file for complete search history.

(56) References Cited

U.S. PATENT DOCUMENTS

| | | | | |
|---|---|---|---|---|
| 4,849,895 A | * | 7/1989 | Kervistin | F01D 11/24 415/178 |
| 6,767,182 B2 | | 7/2004 | Coppola | |
| 7,156,618 B2 | * | 1/2007 | Fish | F04D 29/441 415/208.3 |
| 8,240,974 B2 | | 8/2012 | Nyamu et al. | |
| 8,366,382 B1 | * | 2/2013 | Muldoon | F01D 11/02 415/111 |
| 2009/0238678 A1 | * | 9/2009 | Nyamu | F01D 5/084 415/116 |
| 2011/0123259 A1 | * | 5/2011 | Brunneke | B60G 7/005 403/119 |

(Continued)

FOREIGN PATENT DOCUMENTS

WO    2014105522 A1    7/2014

OTHER PUBLICATIONS

European Search Report for European Application No. 16166312.5 dated Sep. 26, 2016.

*Primary Examiner* — Woody Lee, Jr.
*Assistant Examiner* — Theodore Ribadeneyra
(74) *Attorney, Agent, or Firm* — Carlson, Gaskey & Olds, P.C.

(57) ABSTRACT

A fitting according to an exemplary aspect of the present disclosure includes, among other things, a main body portion having a first axial end and a second axial end opposite the first axial end, an inlet provided at the first axial end, and an outlet adjacent the second axial end. The outlet includes a plurality of circumferentially spaced-apart slots formed through the main body portion, and each slot has an area within a range of 0.52 and 0.59 square inches.

18 Claims, 3 Drawing Sheets

(56) References Cited

U.S. PATENT DOCUMENTS

| | | | |
|---|---|---|---|
| 2013/0283814 A1* | 10/2013 | Johns | F01D 25/14 60/782 |
| 2014/0261797 A1* | 9/2014 | Lior | F16L 41/021 137/561 A |
| 2015/0033757 A1* | 2/2015 | White | F23N 5/006 60/783 |

* cited by examiner

FITTING FOR MID-TURBINE FRAME OF GAS TURBINE ENGINE

BACKGROUND

A gas turbine engine typically includes a fan section, a compressor section, a combustor section, and a turbine section. The compressor section compresses air and delivers it into a combustion chamber. The compressed air is mixed with fuel and combusted in the combustion section. Products of this combustion pass downstream over turbine rotors.

Some known turbine sections include both a high pressure turbine and a low pressure turbine. A mid-turbine frame is positioned axially between the high pressure turbine and the low pressure turbine. The mid-turbine frame includes a series of vanes, which have internal passageways for routing various elements of the engine, such as oil lines, within the engine. The mid-turbine frame is typically provided with a flow of cooling fluid to protect the engine elements from damage caused by exposure to excess heat.

SUMMARY

A fitting according to an exemplary aspect of the present disclosure includes, among other things, a main body portion having a first axial end and a second axial end opposite the first axial end, an inlet provided at the first axial end, and an outlet adjacent the second axial end. The outlet includes a plurality of circumferentially spaced-apart slots formed through the main body portion, and each slot has an area within a range of 0.52 and 0.59 square inches.

In a further embodiment of the foregoing fitting, the fitting includes a deflector plate provided at the second axial end of the main body portion, the deflector plate oriented substantially perpendicular to a central fitting axis.

In a further embodiment of the foregoing fitting, the fitting consists of three slots, and wherein the slots are equally circumferentially spaced-apart from one another relative to a central fitting axis.

In a further embodiment of the foregoing fitting, each of the slots has a length dimension parallel to a central fitting axis, and wherein the length dimension is within a range of 0.74 and 0.76 inches.

In a further embodiment of the foregoing fitting, each of the slots has a width dimension perpendicular to a central fitting axis, and wherein the width dimension is within a range of 0.73 and 0.75 inches.

In a further embodiment of the foregoing fitting, each of the slots has a length dimension parallel to a central fitting axis, and wherein a ratio of the length dimension to an overall length of the fitting within a range of 0.262 to 1 and 0.271 to 1.

In a further embodiment of the foregoing fitting, the fitting further includes a support flange. The support flange is generally triangular in shape and has three corners, and the support flange includes an opening for receiving a fastening element at each of the three corners.

In a further embodiment of the foregoing fitting, the main body portion includes external threads for mating with external threads of a conduit.

In a further embodiment of the foregoing fitting, the fitting is integrally formed of a single piece of material.

In a further embodiment of the foregoing fitting, the material is a stainless steel.

In a further embodiment of the foregoing fitting, the main body portion is substantially cylindrically shaped.

A gas turbine engine according to an exemplary aspect of the present disclosure includes, among other things, a gas path wall providing a radially outer boundary of a core airflow path, an external housing radially spaced-apart from the gas path wall, a source of cooling fluid, and a fitting fluidly coupled to the source of cooling fluid. The fitting is configured to direct cooling fluid from the source to a location radially between the gas path wall and the external housing. The fitting includes an inlet at a first axial end and an outlet adjacent a second axial end. The outlet is provided by a plurality of circumferentially spaced-apart slots, and each slot has an area within a range of 0.52 and 0.59 square inches.

In a further embodiment of the foregoing engine, the external housing is a core nacelle housing.

In a further embodiment of the foregoing engine, the source of cooling fluid is a high pressure compressor.

In a further embodiment of the foregoing engine, the fitting is disposed in a mid-turbine frame of the engine.

In a further embodiment of the foregoing engine, the fitting includes a deflector plate at the second axial end, the deflector plate is arranged such that fluid enters the inlet flowing in a direction substantially parallel to a central fitting axis, and is expelled from the outlet in a direction perpendicular to the central fitting axis.

In a further embodiment of the foregoing engine, the fitting consists of three slots, and the three slots are equally circumferentially spaced-apart from one another relative to a central fitting axis.

In a further embodiment of the foregoing engine, each of the slots has a length dimension parallel to a central fitting axis, and wherein the length dimension is within a range of 0.74 and 0.76 inches.

In a further embodiment of the foregoing engine, each of the slots has a width dimension perpendicular to a central fitting axis, and wherein the width dimension is within a range of 0.73 and 0.75 inches.

In a further embodiment of the foregoing engine, each of the slots has a length dimension parallel to a central fitting axis, and wherein a ratio of the length dimension to an overall length of the fitting is within a range of 0.262 to 1 and 0.271 to 1.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

Figure 1:
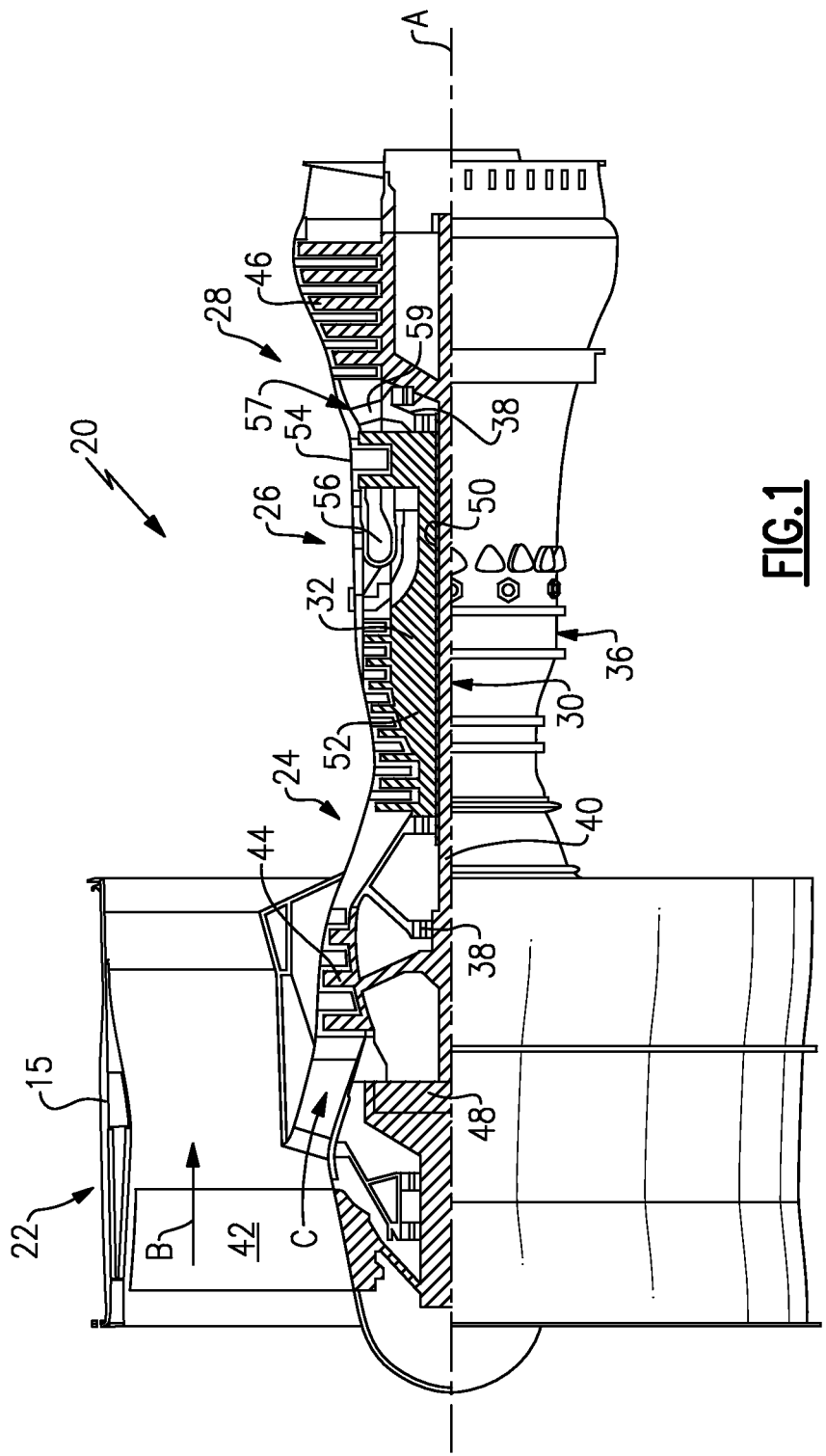
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core airflow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils (e.g., vanes) 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

Figure 2:
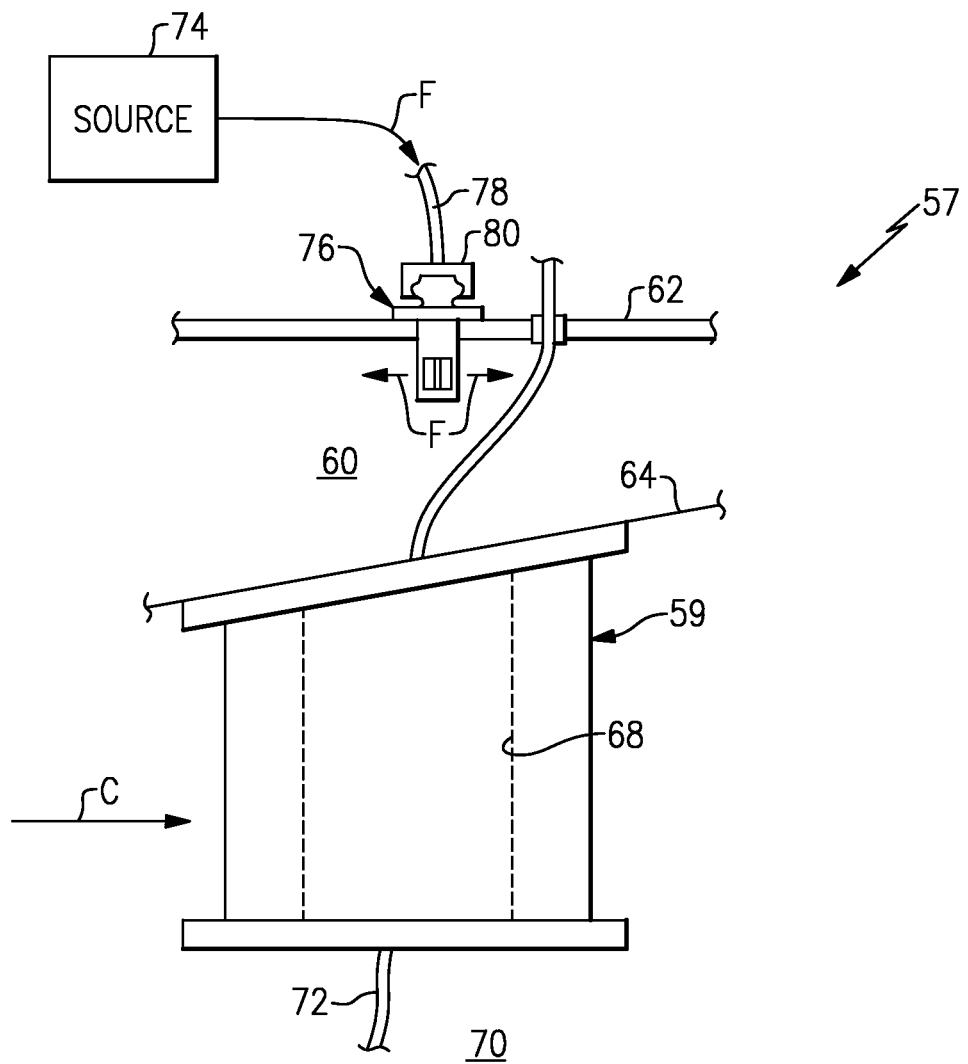
FIG. 2 is a schematic view of an example section of the gas turbine engine. In this example, the section is a mid-turbine frame.

FIG. 2 illustrates a portion of a section of the gas turbine engine 20. In this example, the section is the mid-turbine frame 57. This disclosure could be applicable in other sections of the engine, however. The mid-turbine frame 57 includes a mid-turbine frame compartment 60 radially (in the radial direction R, which is normal to the engine central longitudinal axis A) between an external housing 62 and a gas path wall 64. The external housing 62 in one example is a core nacelle housing. The gas path wall 64 provides a radially outer boundary of the core airflow path C.

The mid-turbine frame 57 further includes a plurality airfoils 59, which in this example are vanes, provided in the core airflow path C. The vanes 59 are circumferentially spaced (in the circumferential direction Z) about the engine central longitudinal axis A, and include internal passageways 68 formed therein for routing engine elements from a radially inner location 70 to a radially outward location, such as the mid-turbine frame compartment 60 or other locations.

FIG. 2 shows one engine element 72. In this example, the engine element 72 is an oil line, and is configured to route a flow of oil between the radially inner location 70 and a location radially outward of the vane 59. Additional engine elements could be routed through the vane 59. This disclosure is not limited to any particular engine element type.

The mid-turbine frame 57 is located downstream of a high pressure turbine 54. Thus, the fluid in the core airflow path C may be relatively hot. In order to protect the engine elements 72 (e.g., the oil line) from exposure to excess heat, a flow of cooling fluid F is provided from a source 74 and into the mid-turbine frame compartment 60 by way of a fitting 76.

In this example, the fitting 76 is fluidly coupled to the source 74 by way of a conduit 78, which is connected to the fitting by a connector 80. The connector 80 may be a threaded connection (discussed below), but is not limited to such a connection type. In one example, the source 74 is the high pressure compressor 52. Cooling fluid could be provided from other engine locations, however.

As illustrated in FIG. 2, fluid F enters the fitting 76 in the radial direction R. Then, the fitting 76 is configured to expel the fluid F into the mid-turbine frame 60 in directions perpendicular (or substantially perpendicular) to the radial direction R. In particular, the fitting 76 directs the fluid F in the circumferential direction Z and in fore and aft directions (e.g., to the left and right, relative to the FIG. 2 arrangement). Dispersing the fluid F in this manner prevents impingement on any particular location, and instead evenly distributes cooling flow within the mid-turbine frame compartment 60.

In one example, the fitting 76 is integrally formed from a single piece of material. One example material type is stainless steel, however other material types come within the scope of this disclosure. Further, while only one fitting 76 is shown in FIG. 2, it should be understood that the mid-turbine frame 57 may include additional fittings circumferentially spaced-apart about the engine central longitudinal axis A.

Figure 3:
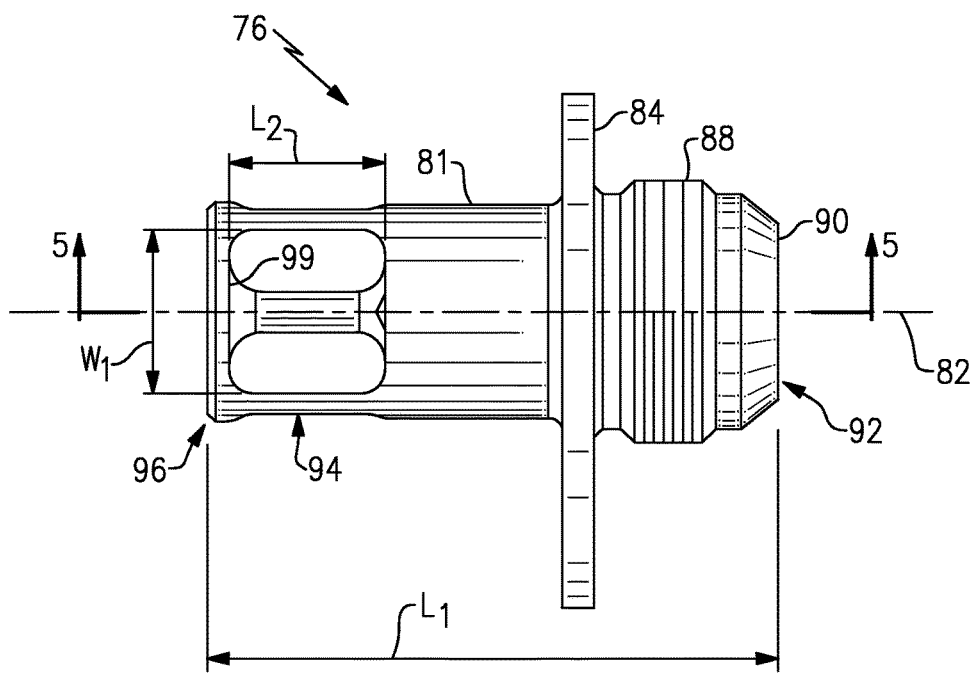
FIG. 3 is a side view of an example fitting according to this disclosure.
Figure 4:
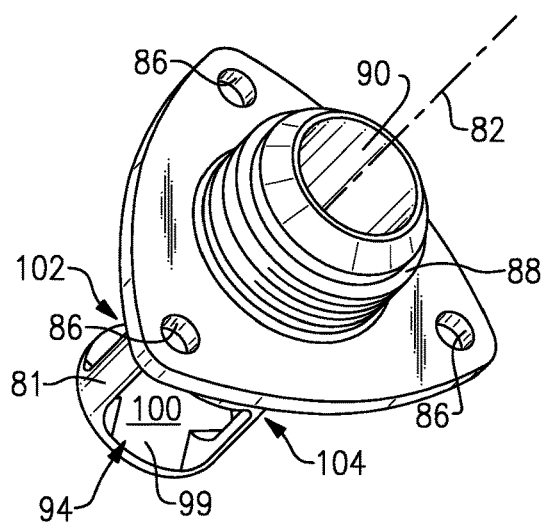
FIG. 4 is a perspective view of the example fitting.
Figure 5:
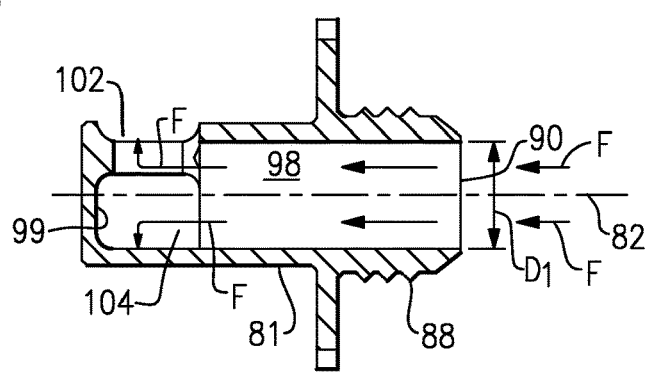
FIG. 5 is a cross-sectional view of the fitting taken along line 5-5 from FIG. 3.

FIGS. 3 and 4 are external views of one example fitting 76. FIG. 5 shows the fitting 76 in cross-section. The fitting 76 includes a main body portion 81 disposed about a central fitting axis 82. The main body portion 81 in this example is substantially cylindrically shaped. The central fitting axis 82 extends through a center of the main body portion 81 along the length $L_1$ of the fitting 76 (e.g., in the left and right directions relative to FIG. 3). Relative to the arrangement of FIG. 2, the central fitting axis 82 extends in the radial direction R and is normal to the engine central longitudinal axis A.

The fitting 76 includes connector flange 84 projecting radially outward (relative to the central fitting axis 82) from the main body portion 81. As shown in FIG. 4, the connector flange 84 includes one or more openings 86 for receiving a fastener element. Further, the connector flange 84 is substantially triangularly-shaped and includes an opening 86 at each corner. The openings 86 may receive any known type of fastener element, which may be configured to connect the connector flange 84 to the external housing 62.

In order to connect to the connector 80 of the conduit 78, for example, the fitting includes external thread 88 configured to correspond to threads of the connector 80. In other examples, threads are not included. In those examples, other connection elements may be used.

The fitting 76 has an inlet 90 at a first axial end 92 and an outlet 94 adjacent a second axial end 96. The inlet 90 is disposed about the central fitting axis 82 and provides an opening to an internal bore 98 within the main body portion 81. The internal bore 98 has a diameter $D_1$, and is centered about the central fitting axis 82, the internal bore 98 provides a fluid passageway within the fitting 76.

The fitting 76 includes a deflector plate 99 at the second axial end 96. The deflector plate 99 is substantially perpendicular to the central fitting axis 82, and is configured to redirect fluid F in a direction perpendicular to the central fitting axis 82 toward the outlet 94. In this example, the outlet 94 includes three slots 100, 102, and 104. The slots 100, 102, 104 are formed through the main body portion 81 and are circumferentially spaced about the central fitting axis 82. In this example, there are only three slots 100, 102, 104, and the slots 100, 102, 104 are equally spaced-apart from one another about the central fitting axis 82.

In this example, each of the slots 100, 102, 104 has a width $W_1$ and a length $L_2$. The slots 100, 102, 104 in this example have rounded corners to reduce stress concentrations at those locations. The length $L_2$ is a dimension substantially parallel to the central fitting axis 82. In one example, a ratio of the length $L_2$ is within a range of 0.262 to 1 and 0.271 to 1 relative to an overall length L of the fitting 76. More particularly, in one example the length $L_2$ is within a range of 0.74 and 0.76 inches (1.88 to 1.93 cm). The width $W_1$ is a dimension substantially perpendicular to the central fitting axis 82, and in one example is within a range of 0.73 and 0.75 inches (1.85 to 1.91 cm). Consistent with these dimensions, the approximate area of each of the slots is within a range of 0.52 and 0.59 square inches (3.35 to 3.81 square cm). Use of the term "within" in this disclosure is inclusive of the boundaries of the range.

During operation of the engine 20, fluid F is directed into the internal bore 98 of the fitting 76 via the inlet 90. The fluid F flows in a direction parallel to the central fitting axis 82 through the internal bore 98 toward the deflector plate 99. The deflector plate 99 turns the fluid F in a direction perpendicular to the central fitting axis 82. The fluid F is then expelled from the fitting via the slots 100, 102, 104. Relative to FIG. 2, the fluid F would be expelled in the circumferential direction Z and in directions parallel to the engine central longitudinal axis A.

The arrangement and size of the slots 100, 102, 104 allows for a minimal pressure drop in the fluid F as it passes through the fitting 76 while also dispersing the fluid F within the mid-turbine frame compartment 60 to provide effective cooling. That is, the size of the slots 100, 102, 104 maintains sufficient fluid pressure such that the fluid F properly cools the engine elements (e.g., the oil line 72) within the mid-turbine frame 57. Further, by expelling the fluid F in directions perpendicular to the central fitting axis 82, the fluid F does not impinge on any one location of the vanes 59 or the mid-turbine frame compartment 60, and instead evenly distributes the flow of cooling fluid.

It should be understood that terms such as "fore," "aft," "axial," "radial," and "circumferential" are used above relative to the normal operational attitude of the engine 20 and/or the fitting, as context dictates. Further, these terms have been used herein for purposes of explanation, and should not be considered otherwise limiting. Terms such as "generally," "substantially," and "about" are not intended to be boundaryless terms, and should be interpreted consistent with the way one skilled in the art would interpret the term.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A fitting, comprising:
a main body portion having a first axial end and a second axial end opposite the first axial end;
an inlet provided at the first axial end;
an outlet adjacent the second axial end, wherein the outlet includes a plurality of circumferentially spaced-apart slots formed through the main body portion, and wherein each slot has an area within a range of 0.52 and 0.59 square inches; and
a support flange, wherein the support flange is generally triangular in shape and has three corners, and wherein the support flange includes an opening for receiving a fastening element at each of the three corners.

2. The fitting as recited in claim 1, further comprising a deflector plate provided at the second axial end of the main body portion, the deflector plate oriented substantially perpendicular to a central fitting axis.

3. The fitting as recited in claim 1, wherein the fitting consists of three slots, and wherein the slots are equally circumferentially spaced-apart from one another relative to a central fitting axis.

4. The fitting as recited in claim 1, wherein each of the slots has a length dimension parallel to a central fitting axis, and wherein the length dimension is within a range of 0.74 and 0.76 inches.

5. The fitting as recited in claim 4, wherein each of the slots has a width dimension perpendicular to a central fitting axis, and wherein the width dimension is within a range of 0.73 and 0.75 inches.

6. The fitting as recited in claim 1, wherein each of the slots has a length dimension parallel to a central fitting axis, and wherein a ratio of the length dimension to an overall length of the fitting within a range of 0.262 to 1 and 0.271 to 1.

7. The fitting as recited in claim 1, wherein the main body portion includes threads for mating with threads of a conduit.

8. The fitting as recited in claim 1, wherein the fitting is integrally formed of a single piece of material.

9. The fitting as recited in claim 8, wherein the material is a stainless steel.

10. The fitting as recited in claim 1, wherein the main body portion is substantially cylindrically shaped.

11. A gas turbine engine, comprising:
a gas path wall providing a radially outer boundary of a core airflow path;
an external housing radially spaced-apart from the gas path wall;
a source of cooling fluid; and
a fitting fluidly coupled to the source of cooling fluid and configured to direct cooling fluid from the source to a location radially between the gas path wall and the external housing, the fitting including an inlet at a first axial end and an outlet adjacent a second axial end, wherein the outlet is provided by a plurality of circumferentially spaced-apart slots, and wherein each slot has an area within a range of 0.52 and 0.59 square inches, wherein the fitting consists of three slots, and wherein the three slots are equally circumferentially spaced-apart from one another relative to a central fitting axis.

12. The gas turbine engine as recited in claim 11, wherein the external housing is a core nacelle housing.

13. The gas turbine engine as recited in claim 12, wherein the source of cooling fluid is a high pressure compressor.

14. The gas turbine engine as recited in claim 11, wherein the fitting includes a deflector plate at the second axial end, wherein the deflector plate is arranged such that fluid enters the inlet flowing in a direction substantially parallel to a central fitting axis, and is expelled from the outlet in a direction perpendicular to the central fitting axis.

15. The gas turbine as recited in claim 11, wherein each of the slots has a length dimension parallel to a central fitting axis, and wherein the length dimension is within a range of 0.74 and 0.76 inches.

16. The gas turbine as recited in claim 15, wherein each of the slots has a width dimension perpendicular to a central fitting axis, and wherein the width dimension is within a range of 0.73 and 0.75 inches.

17. The gas turbine engine as recited in claim 11, wherein each of the slots has a length dimension parallel to a central fitting axis, and wherein a ratio of the length dimension to an overall length of the fitting is within a range of 0.262 to 1 and 0.271 to 1.

18. A gas turbine engine, comprising:
a gas path wall providing a radially outer boundary of a core airflow path;
an external housing radially spaced-apart from the gas path wall;
a source of cooling fluid; and
a fitting fluidly coupled to the source of cooling fluid and configured to direct cooling fluid from the source to a location radially between the gas path wall and the external housing, the fitting including an inlet at a first axial end and an outlet adjacent a second axial end, wherein the outlet is provided by a plurality of circumferentially spaced-apart slots, and wherein each slot has an area within a range of 0.52 and 0.59 square inches;
wherein the external housing is a core nacelle housing;
wherein the source of cooling fluid is a high pressure compressor;
wherein the fitting is disposed in a mid-turbine frame of the engine.

* * * * *